US011314909B2

(12) United States Patent
Rabbani et al.

(10) Patent No.: US 11,314,909 B2
(45) Date of Patent: Apr. 26, 2022

(54) METHODS AND SYSTEMS FOR SIMULATING MULTIPHASE FLOW THROUGH POROUS MEDIA

(71) Applicant: Qatar Foundation for Education, Science and Community Development, Doha (QA)

(72) Inventors: Harris Sajjad Rabbani, Doha (QA); Thomas Daniel Seers, Doha (QA); Dominique Guerillot, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 195 days.

(21) Appl. No.: 16/586,345

(22) Filed: Sep. 27, 2019

(65) Prior Publication Data

US 2020/0110849 A1 Apr. 9, 2020

Related U.S. Application Data

(60) Provisional application No. 62/741,847, filed on Oct. 5, 2018.

(51) Int. Cl.
*G06F 30/20* (2020.01)
*G06F 17/13* (2006.01)
(Continued)

(52) U.S. Cl.
CPC .............. *G06F 30/20* (2020.01); *G06F 17/13* (2013.01); *G01N 13/02* (2013.01); *G01N 15/082* (2013.01); *G01N 2013/0208* (2013.01)

(58) Field of Classification Search
CPC ......... G06F 30/20; G06F 17/13; G01N 13/02; G01N 15/082; G01N 2013/0208
See application file for complete search history.

(56) References Cited

U.S. PATENT DOCUMENTS

| 4,893,504 | A | 1/1990 | O'Meara, Jr et al. |
| 7,351,179 | B2 | 4/2008 | Chen et al. |
| | | (Continued) | |

FOREIGN PATENT DOCUMENTS

| RU | 2593853 C2 | 8/2016 |
| WO | 2011030013 A2 | 3/2011 |

OTHER PUBLICATIONS

Reeves, P.C. and Celia, M.A., 1996. A functional relationship between capillary pressure, saturation, and interfacial area as revealed by a pore-scale network model. Water resources research, 32(8), pp. 2345-2358. (Year: 1996).*

(Continued)

*Primary Examiner* — Chuen-Meei Gan
(74) *Attorney, Agent, or Firm* — K&L Gates LLP

(57) ABSTRACT

The present disclosure provides for generating multiphase flow properties of porous media based on one or more input parameters. For instance, the multiphase flow properties may be a capillary pressure-saturation relationship for the porous media. The one or more input parameters include an interfacial tension along an interface between a wetting fluid and a non-wetting fluid, a contact angle between the interface and a pore wall of the porous media, and a pore throat size. The pore throat size is based on subparameters including a saturation of the wetting fluid, a saturation of the non-wetting fluid, a porosity of the porous media, and an orientation angle between a representative pore body size and a representative pore throat size.

18 Claims, 16 Drawing Sheets

(51) Int. Cl.
*G01N 15/08* (2006.01)
*G01N 13/02* (2006.01)

(56) References Cited

U.S. PATENT DOCUMENTS

| 10,049,172 | B2 | 8/2018 | Zhang et al. |
| 2010/0114506 | A1 | 5/2010 | Hustad |
| 2012/0241149 | A1* | 9/2012 | Chen .................. G01V 3/32 166/250.01 |
| 2013/0259190 | A1 | 10/2013 | Walls et al. |
| 2014/0350860 | A1 | 11/2014 | Mezghani et al. |
| 2018/0253514 | A1 | 9/2018 | Bryant et al. |
| 2019/0005172 | A1 | 1/2019 | Riasi et al. |

OTHER PUBLICATIONS

Leu, L., Georgiadis, A., Blunt, M.J., Busch, A., Bertier, P., Schweinar, K., Liebi, M., Menzel, A. and Ott, H., 2016. Multiscale description of shale pore systems by scanning SAXS and WAXS microscopy. Energy & Fuels, 30(12), pp. 10282-10297. (Year: 2016).*

Liu, G., Zhang, M., Ridgway, C. and Gane, P., 2014. Pore wall rugosity: The role of extended wetting contact line length during spontaneous liquid imbibition in porous media. Colloids and Surfaces A: Physicochemical and Engineering Aspects, 443, pp. 286-295. (Year: 2014).*

Bakhshian, S., Rabbani, H.S. and Shokri, N., 2021. Physics-driven investigation of wettability effects on two-phase flow in natural porous media: recent advances, new insights, and future perspectives. Transport in Porous Media, pp. 1-22. (Year: 2021).*

* cited by examiner

METHODS AND SYSTEMS FOR SIMULATING MULTIPHASE FLOW THROUGH POROUS MEDIA

PRIORITY CLAIM

The present application claims priority to and the benefit of U.S. Provisional Patent Application No. 62/741,847 filed on Oct. 5, 2018, the entirety of which is incorporated herein by reference.

BACKGROUND

Capillary pressure, defined as the pressure difference across a fluid-fluid interface, is an important factor in characterizing the dynamics of immiscible displacement within porous media. For instance, capillary pressure is one of the key properties required for modeling numerous economically and scientifically significant phenomena, such as hydrocarbon recovery from petroleum reservoirs, carbon dioxide sequestration, paper pulp drying, rainwater infiltration through the vadose zone, membrane permeation, and salt precipitation. Conventional, experimental methods to include the mercury intrusion capillary pressure method ("MCIP"), the porous plate method, and the centrifuge method. Such experimental methods have often been carried out within the oil industry as part of Special Core Analysis. The methods, however, are subject to practical limitations, such as being logistically challenging to perform, time-consuming, expensive, and in some instances destructive in nature.

An alternative to the experimental methods is pore-scale modelling, which can be utilized to predict a capillary pressure-saturation relationship for a given porous media. Conventional pore-scale simulation methods can be broadly classified into pore-network modelling approaches ("PNM") and direct numerical simulation approaches ("DNS"), which differ in predictive capabilities and in the amount of required input data, memory, and processor demand during computation. DNS involves solving the Navier-Stokes equation coupled with an interface tacking algorithm directly on pore-scale images. PNM involves idealizing the pore geometry of porous media to a simple configuration and relying on assumptions regarding pore filling events.

DNS is able to describe the fluid flow behavior in porous media with a high degree of accuracy. However, DNS is often prohibitively computationally expensive and memory intensive, thus limiting its application to smaller flow domains. PNM is less computationally expensive and is able to simulate fluid flow through a larger flow domain than DNS, capturing the relevant physics sufficiently well to predict constitutive relationships required to upscale towards macroscopic multiphase fluid flow behavior. However, PNM is still computationally expensive, is limited to smaller sample sizes, and requires complex coding. Further, the accuracy of PNM depends upon pore-scale images as well as the numerical stability of an algorithm.

SUMMARY

The present disclosure relates generally to determining the capillary pressure-saturation relationship of porous media. More specifically, the presently disclosed methods and system provide for a new approach to predicting capillary pressure-saturation relationships for porous media that analytically generates the pore network of given porous media by only utilizing average pore properties rather than complete pore size distribution.

In one aspect of the present disclosure, a non-transitory, computer-readable medium stores instructions which, when performed by a processor, cause the processor to, responsive to receiving one or more input parameters, generate a pressure-saturation relationship for a porous media. The one or more input parameters include an interfacial tension along an interface between a wetting fluid and a non-wetting fluid, a contact angle between the interface and a pore wall of the porous media, and a pore throat size. The pore throat size is based on subparameters including a saturation of the wetting fluid, a saturation of the non-wetting fluid, a porosity of the porous media, and an orientation angle between a representative pore body size and a representative pore throat size.

In another aspect of the present disclosure, a system is provided for forecasting multiphase flow properties through porous media. The system includes a processor and a memory storing instructions which, when executed by the processor, cause the processor to, responsive to receiving one or more input parameters, generate a pressure-saturation relationship for porous media. The one or more input parameters include an interfacial tension along an interface between a wetting fluid and a non-wetting fluid, a contact angle between the interface and a pore wall of the porous media, and a pore throat size.

In another aspect of the present disclosure, a method is provided for forecasting multiphase flow properties through porous media. The method includes determining one or more input parameters and inputting the one or more input parameters to generate a pressure-saturation relationship for a porous media. The one or more input parameters include a porosity of a porous media, an orientation angle between a representative pore body size and a representative pore throat size, and a representative grain size. The pressure-saturation relationship is based on an interfacial tension along an interface between the wetting fluid and the non-wetting fluid, a contact angle between the interface and a pore wall of the porous media, the porosity, the orientation angle, and the representative grain size.

DETAILED DESCRIPTION

Figure 1:
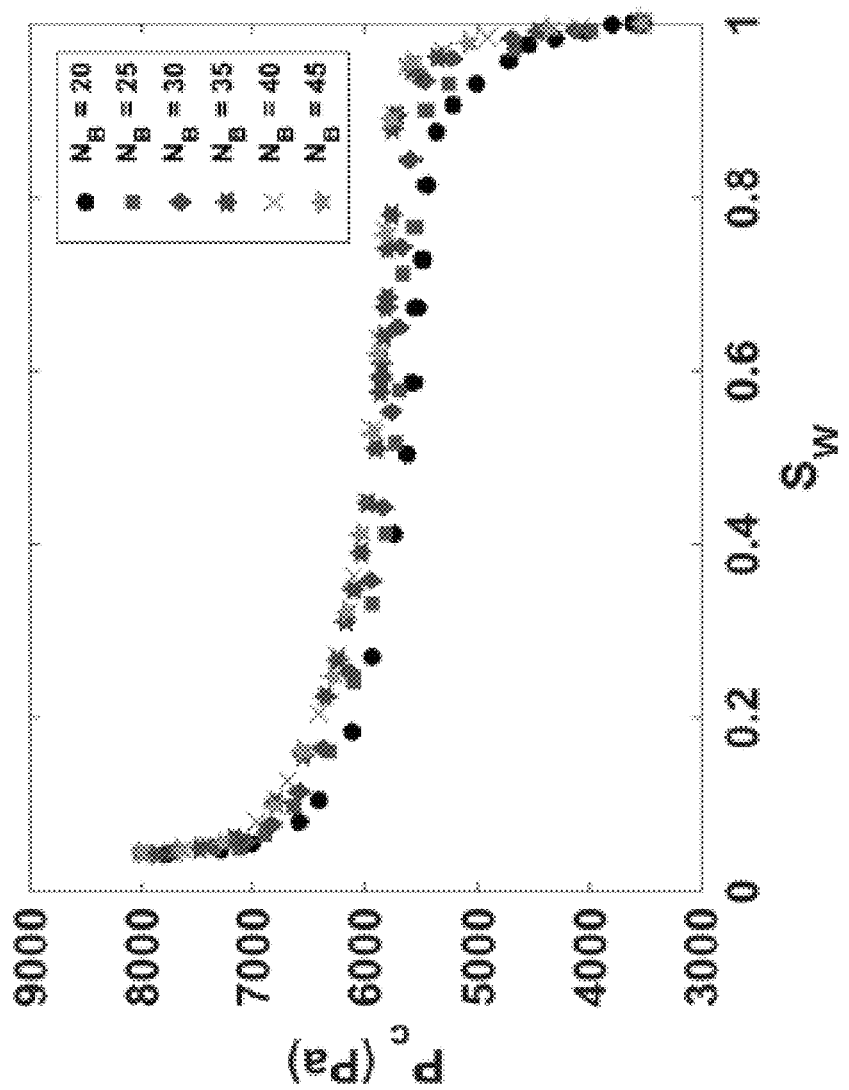
FIG. 1 illustrates a graph showing capillary pressure-saturation trends of porous media.

Capillary pressure and relative permeability measurements are an integral part of special core analysis (SCAL), a laboratory procedure for conducting flow experiments on core plugs taken from a petroleum reservoir, which the oil and gas industry greatly relies on. Capillary pressure measurements are required to determine the thickness of the water-oil transition zone, and to perform some displacement calculations. Reservoir engineers implement the capillary pressure measurements in simulators to determine the amount of hydrocarbons as well as the flowing capacity of fluids in a petroleum reservoir. Relative permeability measurements are required to predict flow in the reservoir and to model reservoir displacement processes. Despite the importance of capillary pressure and relative permeability measurements, conventional laboratory and pore-scale simulation techniques used to measure capillary pressure curves of core samples are expensive, tedious, time-consuming and prone to error.

Accordingly, the presently disclosed methods and system provide for a new analytical methodology that can provide a reliable forecast of capillary pressure-saturation relationships and relative permeability of porous media under static and dynamic conditions, recovery efficiency of fluids, and other properties of multiphase flow through porous media. The provided analytical methodology may represent pore space with a simple idealized geometry. The provided analytical methodology also requires very few input parameters to generate a capillary pressure-saturation relationship for a porous media that, in some instances, can be determined from pore-scale images of reservoir rocks. In other instances, the provided analytical methodology may utilize average pore properties rather than complete pore size distribution, and thus does not rely on input parameters extracted from images.

As such, a capillary pressure-saturation relationship for a porous media may be generated using the provided analytical methodology by solving simple analytical calculations with a data analysis tool (e.g., Microsoft® Excel). For instance, input parameters may be introduced into the equations in the method described below, and a data analysis tool may solve the equations consistent with the provided method to generate the capillary pressure-saturation relationship. In some aspects of the present disclosure, the provided analytical methodology may be implemented into a software application configured to generate capillary pressure-saturation relationships for porous media upon the input of the described parameters.

Thus, the presently disclosed method's analytical formulation allows it to simulate the capillary pressure-saturation relationship of porous media faster than conventional methods and may be free from numerical instabilities associated with numerical solvers. For instance, the accuracy of the provided systems and methods may depend solely on the input data. Moreover, the analytical nature makes the presently disclosed method simple to implement, highly reproducible, and flexible enough to be capable of predicting capillary pressure-saturation behavior from any sample size (e.g., pore- to core-scale). Additionally, the provided method is computationally inexpensive to solve, and thus may have an advantage of being amendable towards integration within existing continuum-scale modelling frameworks.

Therefore, the provided analytical methodology may provide the oil and gas industry an inexpensive, fast, and accurate estimation of capillary pressure-saturation data. The provided methodology may also reduce the number of required laboratory experiments and may facilitate the estimation of capillary pressure-saturation data from un-cored sections of a petroleum reservoir (e.g., using drill cuttings). In addition to the oil and gas industry, the provided analytical methodology may provide a valuable tool towards the study of a broad range of porous media in a variety of other industries (e.g., energy and environment, textile, agriculture, etc.) as the methodology can reduce the need for expensive experiments and time-consuming numerical simulations to determine the multiphase flow properties (e.g., capillary pressure-saturation characteristics) of a given sample.

Throughout this disclosure, reference is made to a number of equations and symbols. Unless stated otherwise, each of the symbols in the various equations has the definition given in Table 1 below. The subscripts n and w refer to non-wetting fluid and wetting fluid, respectively.

TABLE 1

| Symbol | Description |
|---|---|
| Nomenclature | |
| i | i = n (non-wetting fluid) and i = w (wetting fluid) |
| $p_c$ | Capillary Pressure |
| $p_n$ | Pressure of the non-wetting fluid |
| $p_w$ | Pressure of the wetting fluid |
| $\varnothing_{REV}$ | Porosity of hypothesized REV |
| $\varnothing$ | Porosity of porous media under investigation |
| $V_i^*$ | Fluid volumes within the REV |
| $V^*$ | Total volume of REV |
| $s_i$ | Saturation of fluid in porous media under investigation |
| $r_g$ | Grain size of hypothesized REV |
| $r_b$ | Pore Body size of hypothesized REV |
| $r_t$ | Pore throat size of hypothesized REV |
| $N_g$ | Number of pore bodies in hypothesized REV |
| $N_t$ | Number of pore throats in hypothesized REV |
| $N_G$ | Number of grains in hypothesized REV |
| $s_i^*$ | Saturation of fluids in hypothesized REV |
| $x_b$ | Correlation factor between $N_g$ and $N_G$ |
| $x_t$ | Correlation factor between $N_t$ and $N_G$ |
| $\beta$ | Orientation angle between $r_t$ and $r_b$ of hypothesized REV |

TABLE 1-continued

Nomenclature

| Symbol | Description |
|---|---|
| $\overline{R}_i$ | Pore throat size of porous media under investigation |
| $s_{wr}$ | Irreducible wetting phase saturation in porous media under investigation |
| $s_{n-1}$ | Previous saturation of non-wetting fluid in porous media under investigation |
| $s_{w-1}$ | Previous saturation of wetting fluid in porous media under investigation |
| t | Number of capillary pressure-saturation data points |
| $r_{min}$ | Minimum pore throat size of porous media under investigation |
| $f_r(s_w)$ | Roughness coefficient |
| $\overline{R}_t$ | The effective pore throat size of porous media under investigation |
| a | The rugosity parameter for computation of $f_r(s_w)$ |
| $R_b$ | The effective pore body size of porous media under investigation |
| $P_d$ | The displacement pressure |
| $V_b$ | Fractional bulk mercury saturation |
| $V_\infty$ | Fractional bulk mercury saturation at infinite $p_c$ |
| $F_g$ | The pore geometric factor |

One concept important to modelling multiphase flow in porous media is Representative Elementary Volume ("REV"), which is the smallest volume over which a measurement can be made that will yield a value representative of the whole. According to REV concepts, there exists a scale at which heterogeneities in measured properties within a porous media become statistically homogenous and immune to boundary effects to form an effective continuum medium. Hill, R., Elastic properties of reinforced solids: some theoretical principles. J. Mech. Phys. Solids 11 (5), 357-372 (1963). The minimum volume at which this statistical homogenization occurs at is the minimum representative element (e.g., REV) of the porous medium for a given property. As shown in the capillary pressure-saturation trends of FIG. 1, REV exists for the capillary pressure-saturation relationship in porous media. Joekar-Niasar, V., et al., Non-equilibrium effects in capillarity and interfacial area in two-phase flow: dynamic pore-network modelling. J. Fluid Mech. 655, 38-71 (2010). For instance, FIG. 1 shows that the capillary pressure-saturation trends converge for different sizes of pore networks with $N_B$ number of pore bodies as the network size increases.

Thus, using REV concepts as shown in Özdemir, M., Özgüç, A., Porosity variation and determination of REV in porous medium of screen meshes. Int. Commun. Heat Mass Transfer 24 (7), 955-964 (1997), it can be stated that $\emptyset_{REV}=\emptyset$, where $\emptyset_{REV}$ is the porosity of REV and $\emptyset$ is the porosity of the represented porous media. Porosity as used throughout this disclosure is defined as a ratio of void volume to the total volume. Multiplying both sides with respect to the saturation of each container fluid phase leads to Equation 1 below, where $V^*_i$, $V^*$ and $s_i$ are the contained fluid volumes within the REV, the total volume of REV, and fluid saturations for each fluid phase hosted within the porous media, respectively.

$$\frac{V^*_i}{V^*} = \emptyset s_i \text{ for } i = n, w.$$

Equation 1

Figure 2:
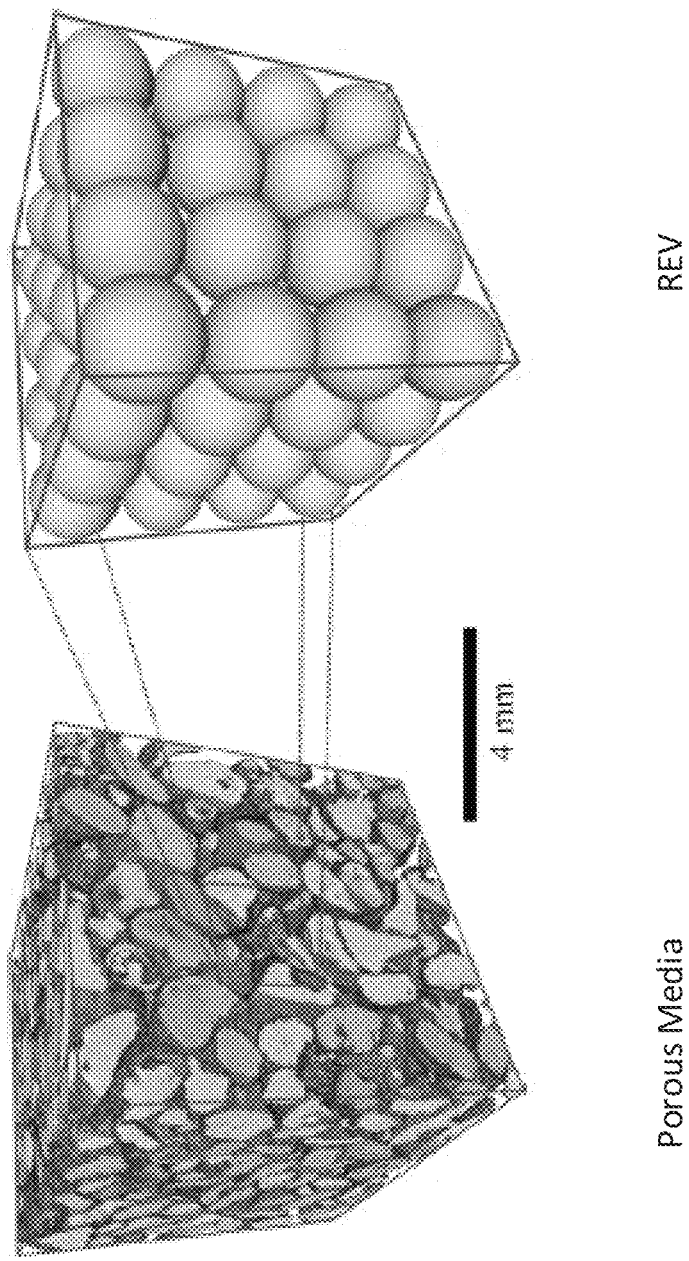
FIG. 2 illustrates a representative elementary volume (REV) of a porous media represented as a hypothesized homogenous porous medium.
Figure 3B:
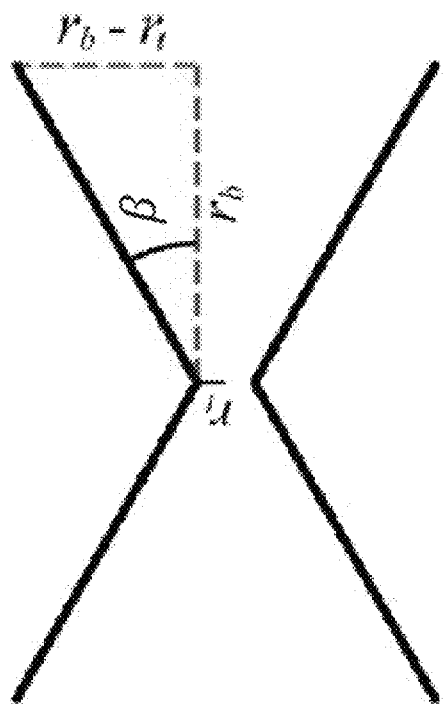
FIG. 3B illustrates converging-diverging channels representing a pore geometry.
Figure 3A:
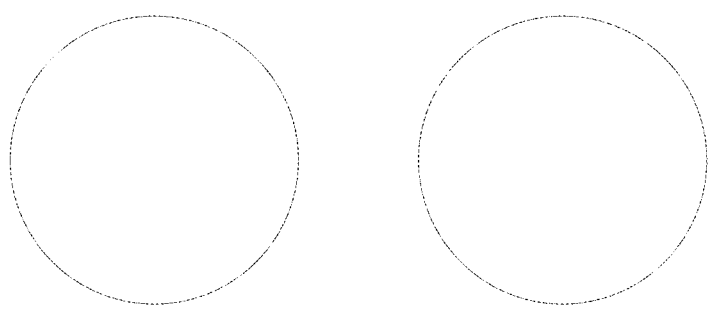
FIG. 3A illustrates a hypothesized homogenous REV.
Figure 3A:
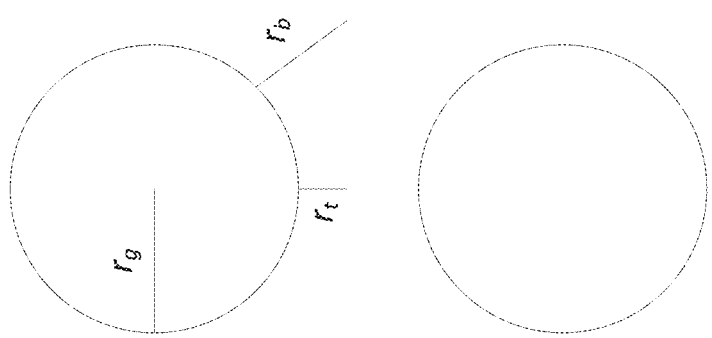

In various examples, to determine $V^*_i$ and $V^*$, REV of a porous media can be represented with a hypothesized homogenous porous medium as shown in FIG. 2. The hypothesized homogenous REV is composed of spherical grains of size $r_g$, pore bodies of size $r_b$, and pore throat sizes of $r_t$ as depicted in FIG. 3A. Including such parameters in Equation 1, yields Equation 2 below, wherein $N_B$, $N_t$, $N_G$, and $s^*_i$ are the number of pore bodies, pore throats, and grains in the hypothesized homogenous REV, as well as saturations of each of its contained fluid phases. Further, for a hypothesized homogenous REV, it can be assumed in various examples that $N_B=x_b N_G$ and $N_t=x_t N_G$, which eliminates $N_B$, $N_t$, and $N_G$ from Equation 2 as shown in Equation 3 below.

$$\frac{N_B r_b^3 + N_t r_t^3}{N_G r_g^3 + N_B r_b^3 + N_t r_t^3} = \frac{\emptyset s_i}{s^*_i}.$$

Equation 2

$$\frac{x_b r_b^3 + x_t r_t^3}{r_g^3 + x_b r_b^3 + x_t r_t^3} = \frac{\emptyset s_i}{s^*_i}.$$

Equation 3

In the hypothesized REV of FIGS. 2 and 3A, adjacent spherical grains produce inwardly concave pore walls and pore throats. In various examples, this pore throat geometry may be represented using simplified converging-diverging channels as depicted in FIG. 3B. In such examples, the relationship between $r_b$ and $r_t$ can be defined as Equation 4 below based on trigonometry, where $\beta$ is the orientation angle between pore throat and pore body. Equation 4 may be substituted into Equation 3 to obtain Equation 5 below.

$$r_b = \frac{r_t}{1 - \tan(\beta)}.$$

Equation 4

$$r_t = \sqrt[3]{\frac{\emptyset s_i (1 - \tan\beta)^3 r_g^3}{s^*_i [x_b + x_t(1 - \tan\beta)^3] - \emptyset s_i [x_b + x_t(1 - \tan\beta)^3]}}.$$

Equation 5

Equation 5 relates the properties of the hypothesized REV with the properties of the real porous media. According to the Delaunay Triangulation theorem it is known that $N_G \approx 2N_B$, and $N_t \approx 3N_B$. Therefore, using Delaunay Tessellation, it can be shown that for a pore network $$x_b = \frac{1}{2} \text{ and } x_t = \frac{3}{2},$$

Equation 5 may be modified to Equation 6 below.

$$r_t = \sqrt[3]{\frac{\emptyset s_i (1 - \tan\beta)^3 r_g^3}{s^*_i \left[\frac{1}{2} + \frac{3}{2}(1 - \tan\beta)^3\right] - \emptyset s_i \left[\frac{1}{2} + \frac{3}{2}(1 - \tan\beta)^3\right]}}.$$

Equation 6

Figure 4:
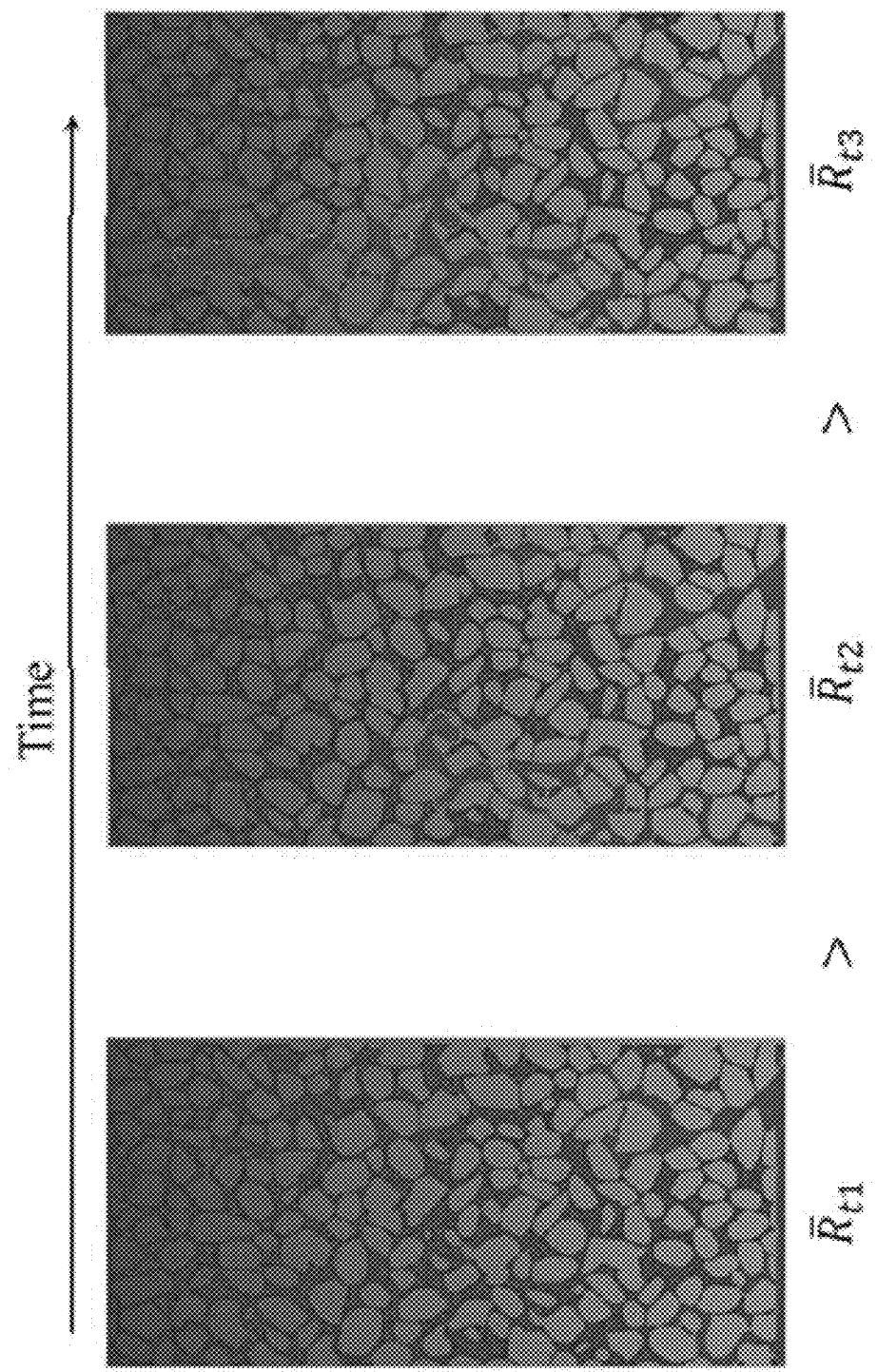
FIG. 4 illustrates a graph showing pore throat size progressively decreasing with the saturation of a wetting fluid.

Changes in pore throat size $\overline{R}_t$ occupied by the fluid-fluid interface as it moves through the complete porous medium, rather than REV, may then be evaluated. In some instances, fluid may flow in drainage conditions in which the non-wetting fluid invades the porous medium and displaces the wetting fluid. During drainage, pore throat size $\overline{R}_t$ progressively decreases with $s_w$ as shown in FIG. 4. In various examples, the finite difference method can be used to compute $\overline{R}_t$ in Equation 7 below as the saturation of fluids changes from a range of $s_w = s_{wi}$ to $s_w = 1$ where $s_{wi}$ is the irreducible wetting phase saturation and $s_{n-1}$ is the saturation of non-wetting fluid at the previous step. The corresponding saturation of fluids can be computed according to Equation 8 and Equation 9 below.

$$\overline{R}_t(s_n) = \overline{R}_t(s_{n-1}) + \frac{\delta \overline{R}_t}{\delta s_{n-1}}[s_n - s_{n-1}]. \qquad \text{Equation 7}$$

$$s_w = s_{w-1} + \frac{1 - s_{wr}}{t}. \qquad \text{Equation 8}$$

$$s_n = 1 - s_w. \qquad \text{Equation 9}$$

In Equation 9, t is the number of capillary pressure-saturation data points to be used in generating the capillary pressure-saturation relationship. The estimation of $\overline{R}_t(s_n)$ depends upon t, and larger values of t may result in more accurate estimates of $\overline{R}_t(s_n)$. In some examples, to estimate $$\frac{\delta \overline{R}_t}{\delta s_{n-1}}$$

in Equation 7, it may be assumed that $$\frac{\delta \overline{R}_t}{\delta s_n}$$

is mathematically similar to $$\frac{\delta r_t}{\delta s_n^*}$$

and accordingly $$\frac{\delta \overline{R}_t}{\delta s_n}$$

may be directly computed from Equation 6, as shown in Equation 10 below. Further, Equation 10 may be incorporated into Equation 7 to obtain Equation 11 below. With regard to Equation 11, in some examples, it may be assumed that $s_n^* \approx s_n$ for purposes of evaluating the complete porous medium, not solely REV. At $s_w = s_{wr}$, $\overline{R}_t(s_{n-1})$ equates to the smallest pore throat within the studied porous medium $r_{tmin}$.

$$\frac{\delta \overline{R}_t}{\delta s_n} = \qquad \text{Equation 10}$$

$$-\frac{\sqrt[3]{\phi s_n (1-\tan\beta)^3 r_g^3}}{3} \times \left[\frac{\frac{1}{2} + \frac{3}{2}(1-\tan\beta)^3}{\left[s_n^*\left[\frac{1}{2} + \frac{3}{2}(1-\tan\beta)^3\right] - \right]^{\frac{4}{3}}}\right].$$
$$\left[\phi s_n\left[\frac{1}{2} + \frac{3}{2}(1-\tan\beta)^3\right]\right]$$

$$\overline{R}_t(s_n) = \overline{R}_t(s_{n-1}) - \frac{\sqrt[3]{\phi s_{n-1}(1-\tan\beta)^3 r_g^3}}{3} \times \qquad \text{Equation 11}$$

$$\left[\frac{\frac{1}{2} + \frac{3}{2}(1-\tan\beta)^3}{\left[s_{n-1}\left[\frac{1}{2} + \frac{3}{2}(1-\tan\beta)^3\right] - \right]^{\frac{4}{3}}}\right] \times [s_n - s_{n-1}].$$
$$\left[\phi s_{n-1}\left[\frac{1}{2} + \frac{3}{2}(1-\tan\beta)^3\right]\right]$$

In some examples of the present disclosure, variations in pore shape associated with porous media may be ignored. For instance, in such examples, pore bodies and pore throats may be treated as spherical with circular cross-sections. In other examples, a roughness coefficient may be introduced to take into account the highly angular pores, grooves, edges, and tortuous pathways of the porous media that can have a strong impact on the capillary pressure-saturation relationship. The roughness coefficient $f_r(s_w)$ adjusts the pore throat size $\overline{R}_t$ to obtain an effective pore throat size $\hat{R}_t$, which are related according to Equation 12 below. Inclusion of the roughness coefficient may increase the accuracy of the capillary pressure-saturation relationship generation in some instances.

$$\hat{R}_t = f_r(s_w)\overline{R}_t \qquad \text{Equation 12.}$$

From the pore-scale perspective, under drainage conditions, the fluid-fluid interface penetrates into the porous media via piston-like displacement. Joekar Niasar, V., et al., Simulating drainage and imbibition experiments in a high-porosity micromodel using an unstructured pore network model. Water Resour. Res. 45 (2) (2009). Using heuristic evaluation, for piston-like displacements it can be hypothesized that $f_r(s_w)$ varies with $s_w$ in accordance with Equation 13 below, wherein a is a rugosity parameter that will vary depending on the type of porous media being analyzed. For instance, the rugosity parameter may vary depending on the surface roughness of the porous media being analyzed.

$$f_r(s_w) \sim \frac{1}{(s_w^a + (1-s_w)^2)\exp(s_w)}. \qquad \text{Equation 13}$$

Figure 5:
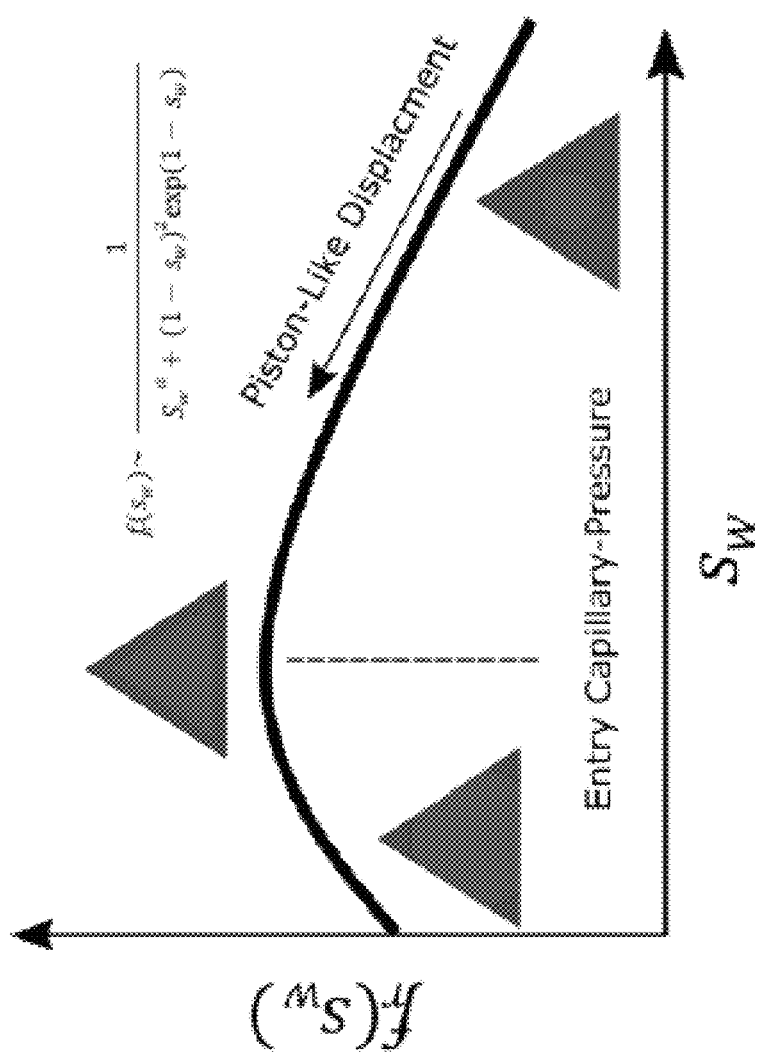
FIG. 5 illustrates an example schematic of a roughness coefficient as a function of the saturation of a wetting fluid under drainage conditions.
Figure 6:
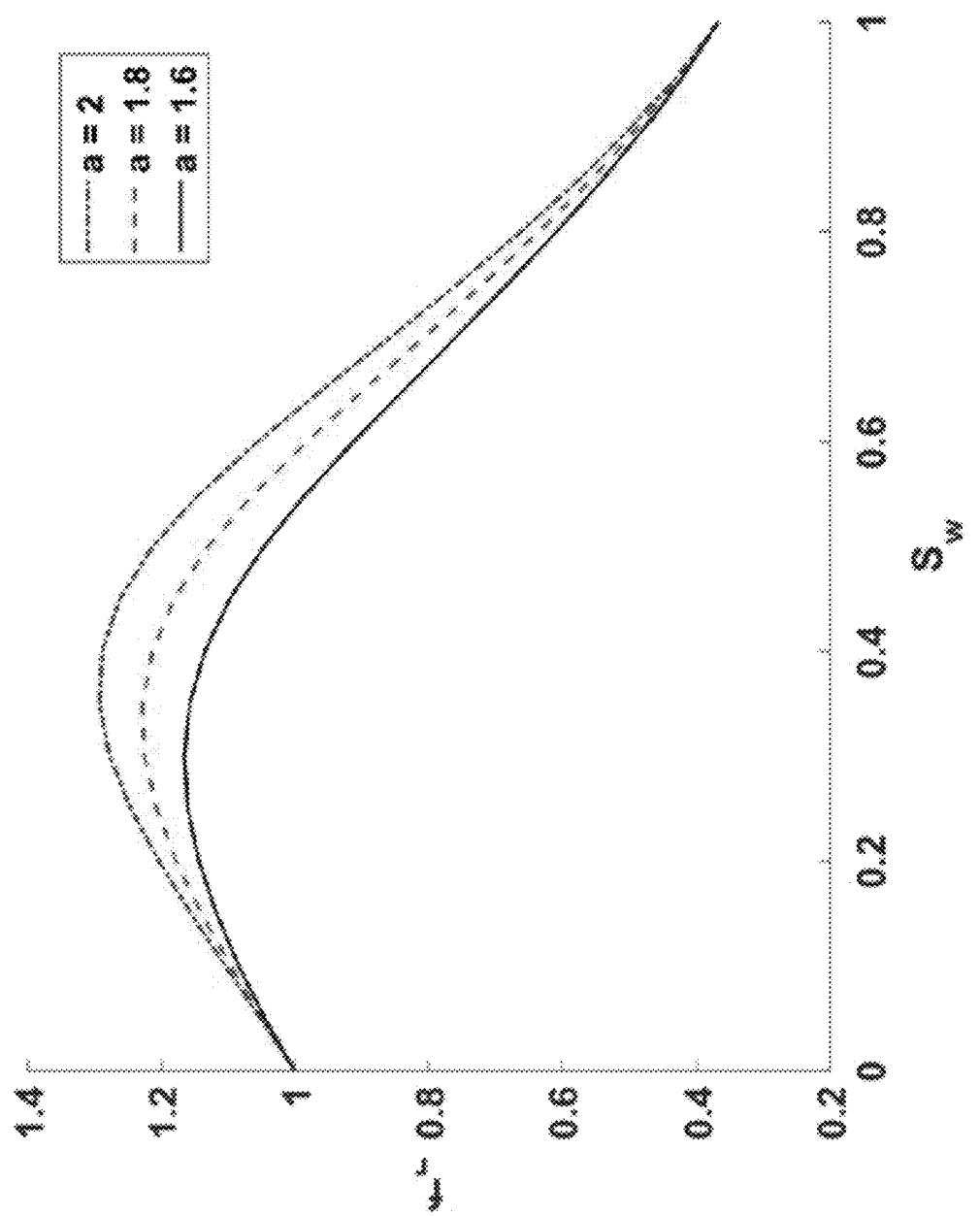
FIG. 6 illustrates example trends of a roughness coefficient as a function of the saturation of a wetting fluid in response to variations in a rugosity parameter.

FIG. 5 illustrates an example schematic of $f_r$ as a function of $s_w$ under drainage conditions. Initially, as the interface enters the angular capillary its shape is quite regular; however, as the displacement proceeds it will start to distort according to the geometry of the pore, and therefore the roughness coefficient $f_r(s_w)$ increases with a decrease in the saturation of the wetting fluid $s_w$. As shown in FIG. 5, at maximum $f_r(s_w)$ the interface is similar to the geometry of a capillary. Accordingly, the maximum $f_r(s_w)$ may correspond to the entry capillary pressure. In some instances, $f_r(s_w)$ may be at a maximum when the interface has attained the entry capillary pressure. After reaching the entry capillary pressure, the interface may regain its regular form and break into individual arc meniscus as shown in FIG. 5, meaning that $f_r(s_w)$ declines. FIG. 6 illustrates example trends of $f_r(s_w)$ in response to variations in the rugosity parameter a.

Including Equation 13 in Equation 12 results in Equation 14 below. Including Equation 14 in the Young-Laplace equation generates the capillary pressure-saturation relationship for porous media under drainage conditions, as given by Equation 15 below, where a is the interfacial tension along the fluid-fluid interface, and θ is the contact angle formed between the interface and the pore wall. Data may be input into Equation 15 in order to generate a capillary pressure-saturation relationship for a given porous media under drainage conditions. For instance, Equation 15 may be implemented into a software application or may be utilized with a data analysis tool to generate the pressure-saturation relationship for a given porous media.

$$\hat{R}_t = \frac{\overline{R}_t(s_n)}{(S_w^a + (1-s_w)^2)\exp(s_w)}. \quad \text{Equation 14}$$

$$p_c(s_w) = \frac{2\sigma\cos(\theta)}{\hat{R}_t}. \quad \text{Equation 15}$$

In some instances of the present disclosure, fluid may flow in imbibition conditions, in which wetting fluid displaces the non-wetting fluid. Generating a capillary pressure-saturation relationship for imbibition conditions is similar to the above-described drainage conditions, with some modifications discussed in the following description. The saturation of fluids may be modified during imbibition conditions as Equations 16 and 17 below, where $s_{wr}$ is the saturation of wetting fluid at the residual saturation of non-wetting fluid. In various examples, t in the case of imbibition may be similar to that used for drainage displacement.

$$s_w = s_{w-1} + \frac{s_{wr} - s_{wi}}{t}. \quad \text{Equation 16}$$

$$s_n = 1 - s_w. \quad \text{Equation 17}$$

Figure 7:
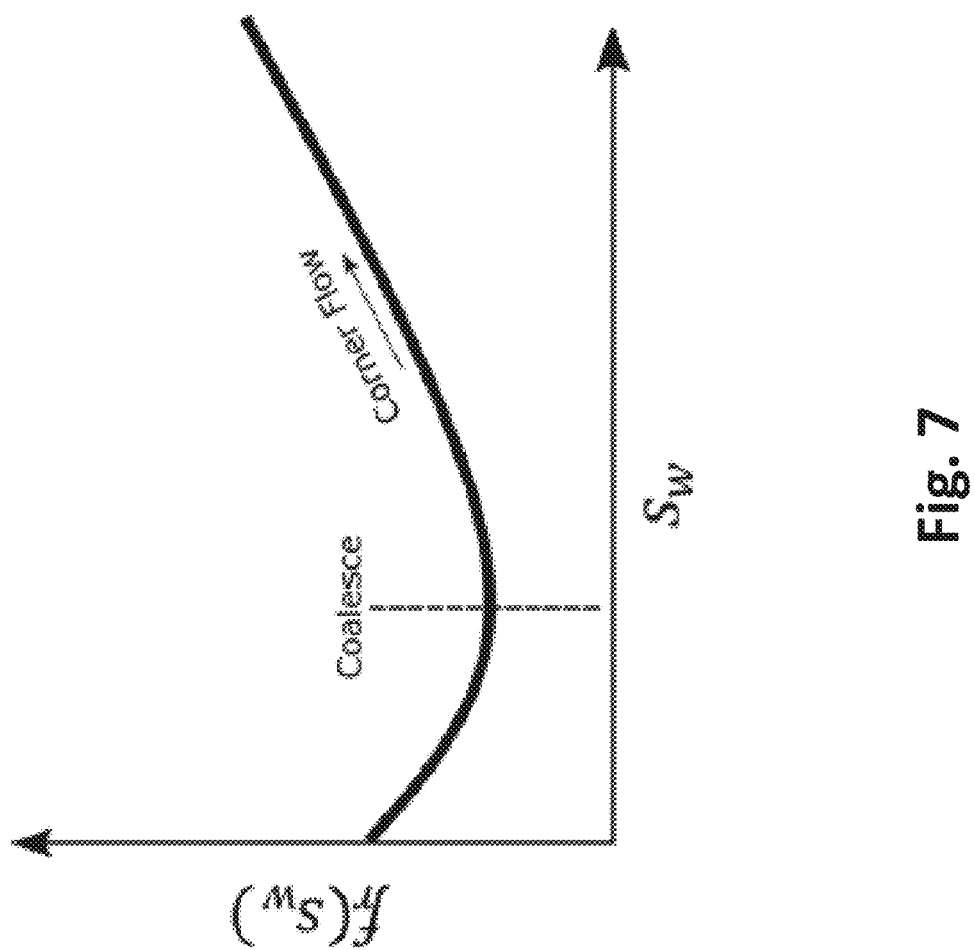
FIG. 7 illustrates an example schematic showing variation in a roughness coefficient as a result of the saturation of a wetting fluid for the corner flow mechanism.

During imbibition, corner flow is the dominant pore-scale invasion protocol. Therefore, the roughness coefficient $f_r(s_w)$ for the imbibition case may be modified in accordance with Equation 18 below. FIG. 7 illustrates a schematic showing variation in $f_r$ as a result of $s_w$ for the corner flow mechanism. Initially, during corner flow, the individual arc meniscus moves away from the vertex of the angular capillary until they coalesce. Therefore, Jr declines as $s_w$ increases in FIG. 7. After arc interfaces coalesce the probability of the non-wetting phase to get trapped increases. Moreover, it is known from the literature that trapping of non-wetting phase during imbibition is closely associated with the angularity of pores. Accordingly, $f_r(s_w)$ increases with $s_w$ after the individual arc meniscus coalesce. Ma, S., et al., Effect of contact angle on drainage and imbibition in regular polygonal tubes. Colloids Surf. A 117 (3), 273-291(1996); Mason, G., Morrow, N., Capillary behavior of a perfectly wetting liquid in irregular triangular tubes. J. Colloid Interface Sci. 141 (1), 262-274 (1991).

$$f_r(s_w) \sim \frac{1}{\left(s_w^{\frac{1}{a}} + (1-s_w)^{\frac{1}{2}}\right)\exp(1-s_w)}. \quad \text{Equation 18}$$

Including Equation 18 in Equation 12 modifies the effective pore throat size $\hat{R}_t$ in the imbibition case to Equation 19 below. During imbibition, $\hat{R}_t$ and a values may remain similar to drainage conditions. Because it is the pore body that controls the displacement dynamics during imbibition rather than pore throat, $\hat{R}_t$ is converted to a corresponding effective pore body size $\hat{R}_b$ in accordance with Equation 20 below. Including Equation 20 in the Young-Laplace equation results in the capillary pressure-saturation relationship for imbibition conditions, as given by Equation 21 below. Data may be input into Equation 21 in order to generate a capillary pressure-saturation relationship for a given porous media under imbibition conditions.

$$\hat{R}_t = \frac{\overline{R}_t(s_n)}{\left(S_w^{\frac{1}{a}} + (1-s_w)^{\frac{1}{2}}\right)\exp(1-s_w)}. \quad \text{Equation 19}$$

$$\hat{R}_b = \frac{\hat{R}_t}{1 - \tan(\beta)}. \quad \text{Equation 20}$$

$$p_c(s_w) = \frac{2\sigma\cos(\theta)}{\hat{R}_b}. \quad \text{Equation 21}$$

Consistent with the above description, the variables required to generate the capillary pressure-saturation relationship in accordance with Equations 15 and/or 21 are Ø, $r_g$, $r_{tmin}$, a, σ, and θ. In some examples, β may be computed via Equation 4 by replacing $r_t$ with a mean pore throat of studied porous media and $r_b$ with a mean pore body of studied porous media. In other examples, β may be determined from pore-scale images or experiments. In some instances, Ø and/or $r_{tmin}$ may additionally or alternatively be determined from pore-scale images or experiments. In various examples, σ, the interfacial tension along the fluid-fluid interface, and θ, the contact angle formed between the interface and the pore wall, are measured from pore-scale images or experiments. In other examples σ and θ may be determined by making assumptions to similar situations. Such pore-scale images or experiments, in some instances, may include thin section photomicrographs, e-ray micro CT volume images, confocal microscopy, or other suitable techniques. In instances in which digital images are utilized to determine input parameters, digital images with a higher resolution may tend to produce more accurate capillary pressure-saturation relationships. In some instances, a morphological concept may be applied during image segmentation to achieve more robust results, for example, the morphological concept disclosed by Silin, D., Patzek, T., Pore space morphology analysis using maximal inscribed spheres. Physica A 371 (2), 336-360 (2006).

In some examples, in order to compute $r_g$, a guess value may initially be used for $r_g$ in Equation 11. Then, in conjunction with Equation 14, the Equation 22 below may be minimized to obtain a value for $r_g$. With regard to the rugosity parameter a, a guess value may initially be used in some instances. For example, in some instances a value of a=2 may be initially used. Using the computed $r_g$ from Equation 22, $$\frac{\delta \hat{R}_t}{\delta s_w}$$

may then be calculated tor all saturations in some aspects. In such aspects, if for any saturation value $$\frac{\delta \hat{R}_t}{\delta s_w} < 0,$$

then the effective pore throat size $\hat{R}_t$ and the grain size of the hypothesized REV $r_g$ may be recalculated with Equations 11, 14, and 22 with smaller values of a until for all saturations $$\frac{\delta \hat{R}_t}{\delta s_w} > 0.$$

$$r_g = \min\left\{\frac{[r_t - \hat{R}_t(s_n = 0.5)]^2}{r_t}\right\}. \quad \text{Equation 22}$$

Figure 8:
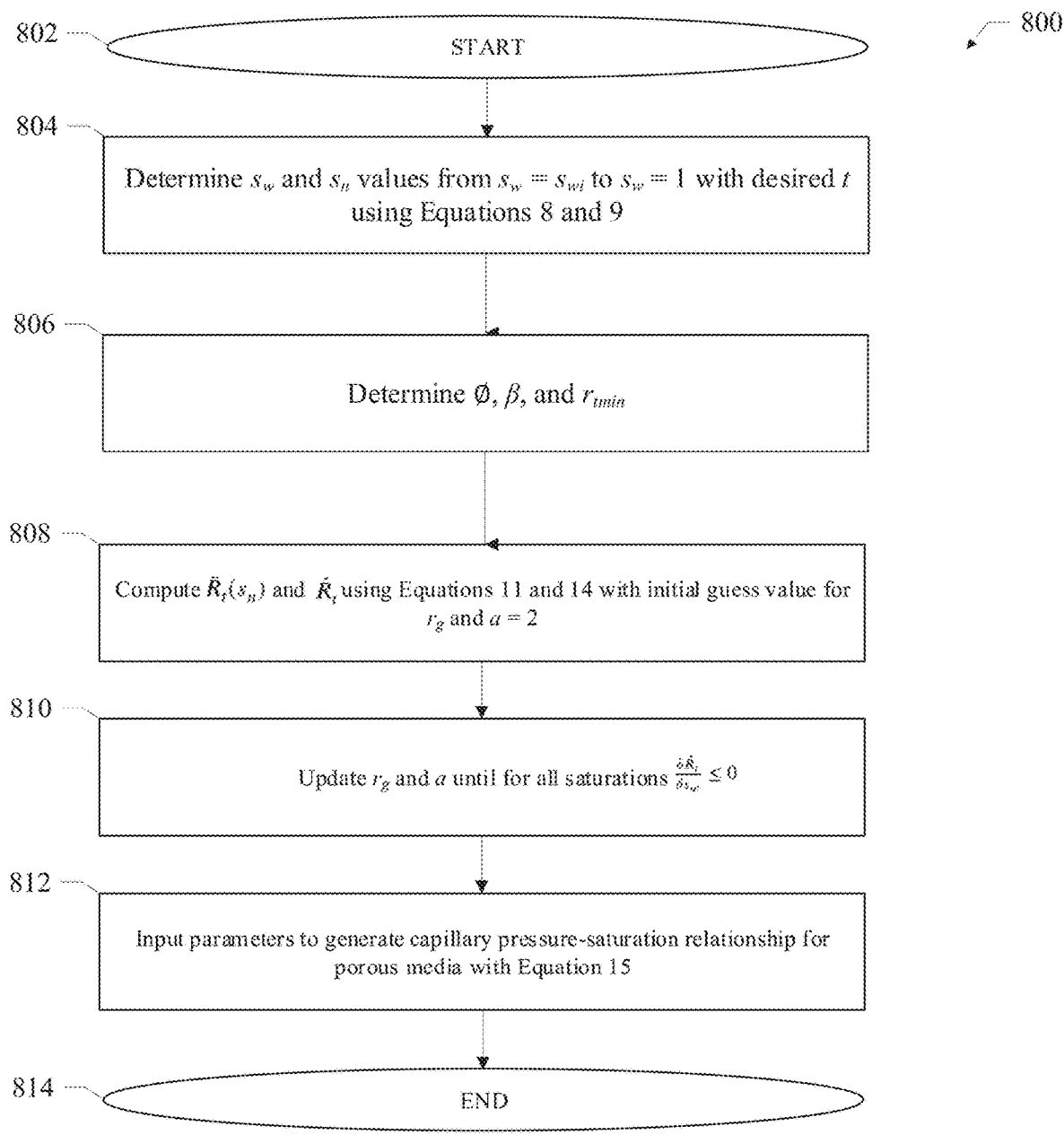
FIG. 8 illustrates an example method for forecasting multiphase flow properties through porous media under drainage conditions, according to an aspect of the present disclosure.

FIG. 8 illustrates a box diagram of an example method 800 for generating a capillary pressure-saturation relationship of porous media under drainage conditions, according to an aspect of the present disclosure. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks described may be optional.

At step 802, the example method 800 begins. At step 804, $s_w$ and $s_n$ values are determined from $s_w=s_{wi}$ to $s_w=1$ with a desired t value using Equations 8 and 9. The saturation values at which the capillary pressures are calculated are accordingly determined. At step 806, values for $\emptyset$, $\beta$, and $r_{tmin}$ are determined. In some instances, $\emptyset$, $\beta$, and $r_{tmin}$ may be determined from pore-scale images or experiments. In some instances, $\beta$ may be determined via Equation 4 by replacing $r_t$ with a mean pore throat of studied porous media and $r_b$ with a mean pore body of studied porous media. At step 808, a pore throat size $\overline{R}_t(s_n)$ and an effective pore throat size $\hat{R}_t$ are computed using Equations 11 and 14 with an initial guess value for $r_g$ and a=2. In other examples, a may initially begin with a different value. At step 810, the values for $r_g$ and a are updated until for all saturations $$\frac{\delta \hat{R}_t}{\delta s_w} \leq 0.$$

At step 812, parameters are input in order to generate a capillary pressure-saturation relationship for a porous media with Equation 15. At step 814, the example method 800 ends.

Figure 9:
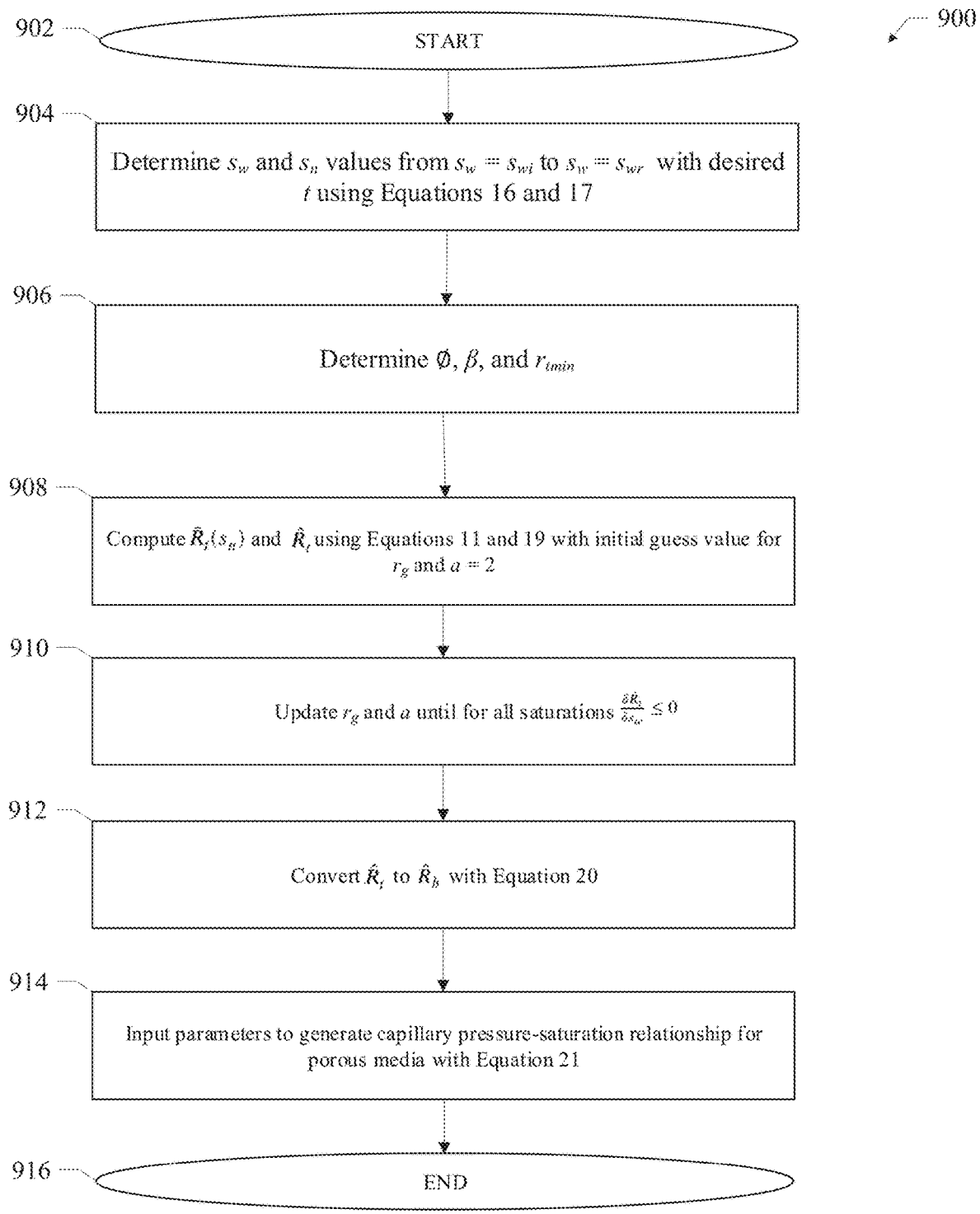
FIG. 9 illustrates an example method for forecasting multiphase flow properties through porous media under imbibition conditions, according to an aspect of the present disclosure.

FIG. 9 illustrates a box diagram of an example method 900 for generating a capillary pressure-saturation relationship of porous media under imbibition conditions, according to an aspect of the present disclosure. Although the examples below are described with reference to the flowchart illustrated in FIG. 9, many other methods of performing the acts associated with FIG. 9 may be used. For example, the order of some of the blocks may be changed, certain blocks may be combined with other blocks, one or more of the blocks may be repeated, and some of the blocks described may be optional.

At step 902, the example method 900 begins. At step 904, $s_w$ and $s_n$ values are determined from $s_w=s_{wi}$ to $s_w=s_{wr}$ with a desired t value using Equations 16 and 17. In some examples, the t value may be similar to the t value used in drainage conditions. At step 906, values for $\emptyset$, $\beta$, and $r_{tmin}$ are determined. In some instances, $\emptyset$, $\beta$, and $r_{tmin}$ may be determined from pore-scale images or experiments. In some instances, $\beta$ may be determined via Equation 4 by replacing $r_t$ with a mean pore throat of studied porous media and $r_b$ with a mean pore body of studied porous media. In some instances, the $\emptyset$, $\beta$, and $r_{tmin}$ values may be the same or similar to their respective values in drainage conditions. At step 908, a pore throat size $\overline{R}_t(s_n)$ and an effective pore throat size $\hat{R}_t$ are computed using Equations 11 and 19 with an initial guess value for $r_g$ and a=2. At step 910, the values for $r_g$ and a are updated until for all saturations $$\frac{\delta \hat{R}_t}{\delta s_w} \leq 0.$$

In some instances, the $\overline{R}_t(s_n)$, $r_g$, and a values may be similar to drainage conditions. At step 912, the effective pore throat size $\hat{R}_t$ is converted to an effective pore body size $\hat{R}_b$ with Equation 20. At step 914, parameters are input to generate a capillary pressure-saturation relationship for a porous media with Equation 21. At step 916, the example method 900 ends.

Figure 10:
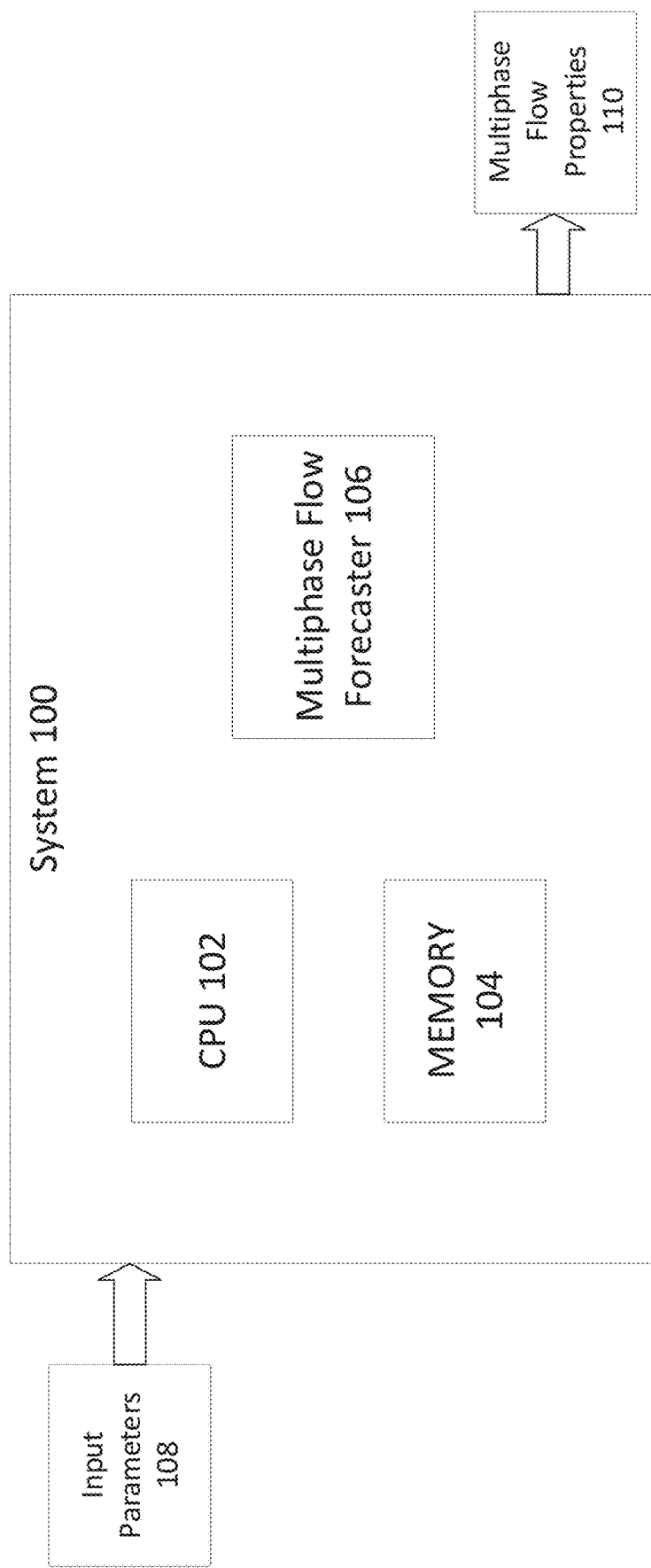
FIG. 10 illustrates an example system for forecasting multiphase flow properties through porous media, according to an aspect of the present disclosure.

FIG. 10 illustrates an example system 100 for forecasting multiphase flow properties of porous media, according to one aspect of the present disclosure. The example system 100 includes different components that are representative of computational processes, routines, and/or algorithms. In some embodiments, the computational processes, routines, and/or algorithms may be specified in one or more instructions stored on a computer readable medium that, when executed by a processor of the system 100, cause the system 100 to perform the operations discussed below. For example, all or part of the computational processes, routines, and/or algorithms may be implemented by the CPU 102 and the memory 104. In other examples, the components of the system 100 may be combined, rearranged, removed, or provided on a separate device or server.

The example system 100 may include a multiphase flow forecaster 106 that is configured to generate (e.g., forecast) multiphase flow properties 110 of a porous media upon receiving input parameters 108. For example, the multiphase flow forecaster 106 may generate a capillary pressure-saturation relationship of the porous media as the multiphase flow properties 110. In various instances, the multiphase flow forecaster 106 is configured to implement the above-described Equations consistent with the above-described method upon receiving the input parameters 108 to generate multiphase flow properties 110 of porous media. For example, the input parameters 108 may be an interfacial tension along an interface between a wetting fluid and a non-wetting fluid, a contact angle between the interface and a pore wall of the porous media, and a pore throat size. The pore throat size may be based on subparameters including a saturation of the wetting fluid, a saturation of the non-wetting fluid, a porosity of the porous media, an orientation angle between a representative pore body size and a representative pore throat size, a representative grain size, and a rugosity of the porous media.

Figure 11:
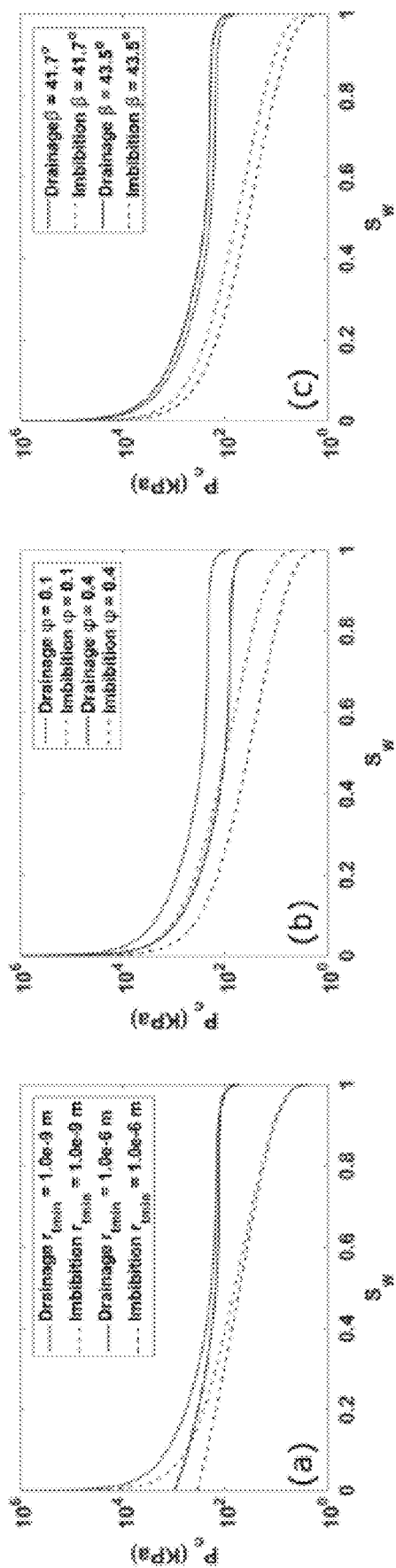
FIG. 11 illustrates the results of a sensitivity analysis performed for capillary pressure-saturation relationships generated by the provided methods.
Figure 12:
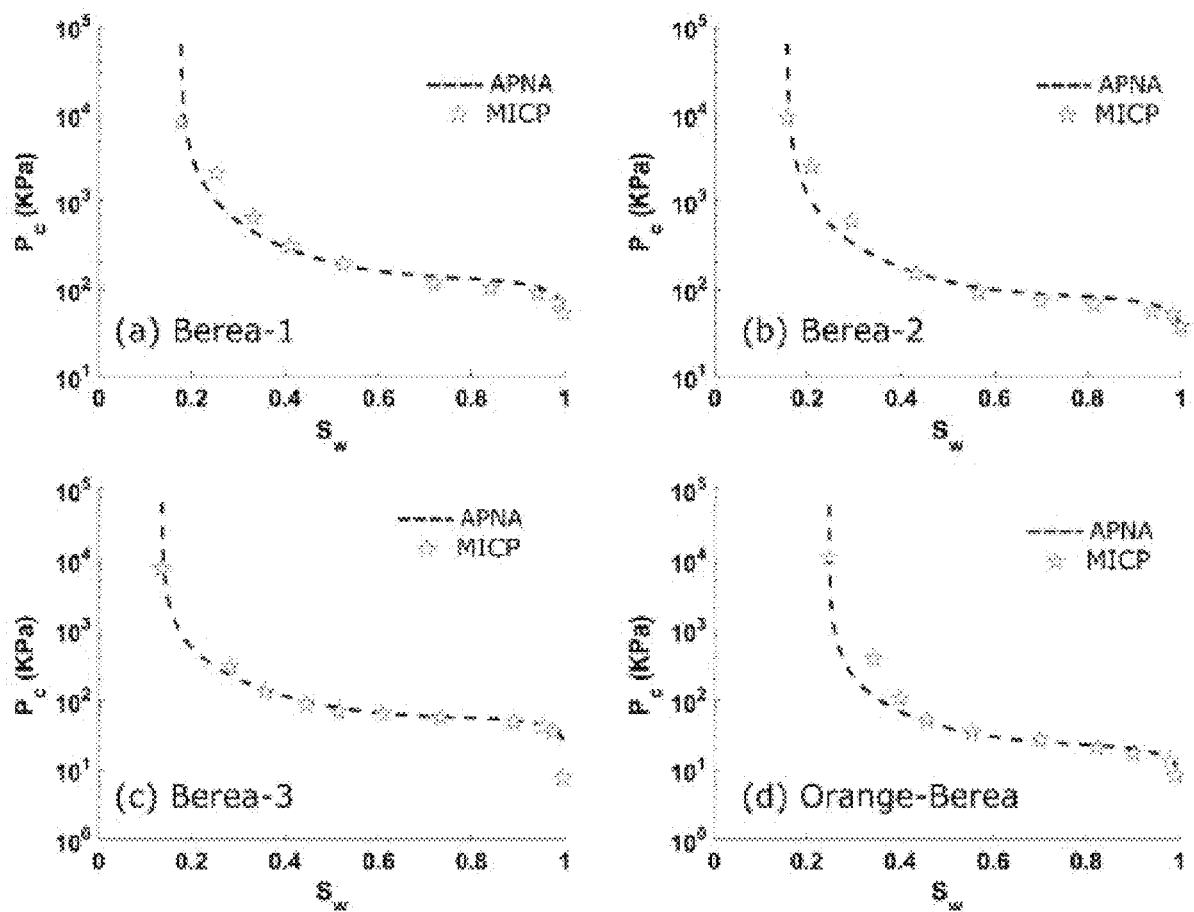
FIG. 12 illustrates a comparison between the provided method and conventional methods for forecasting multiphase flow properties of various Berea sandstone samples with differing grain textural properties under drainage conditions.
Figure 13:
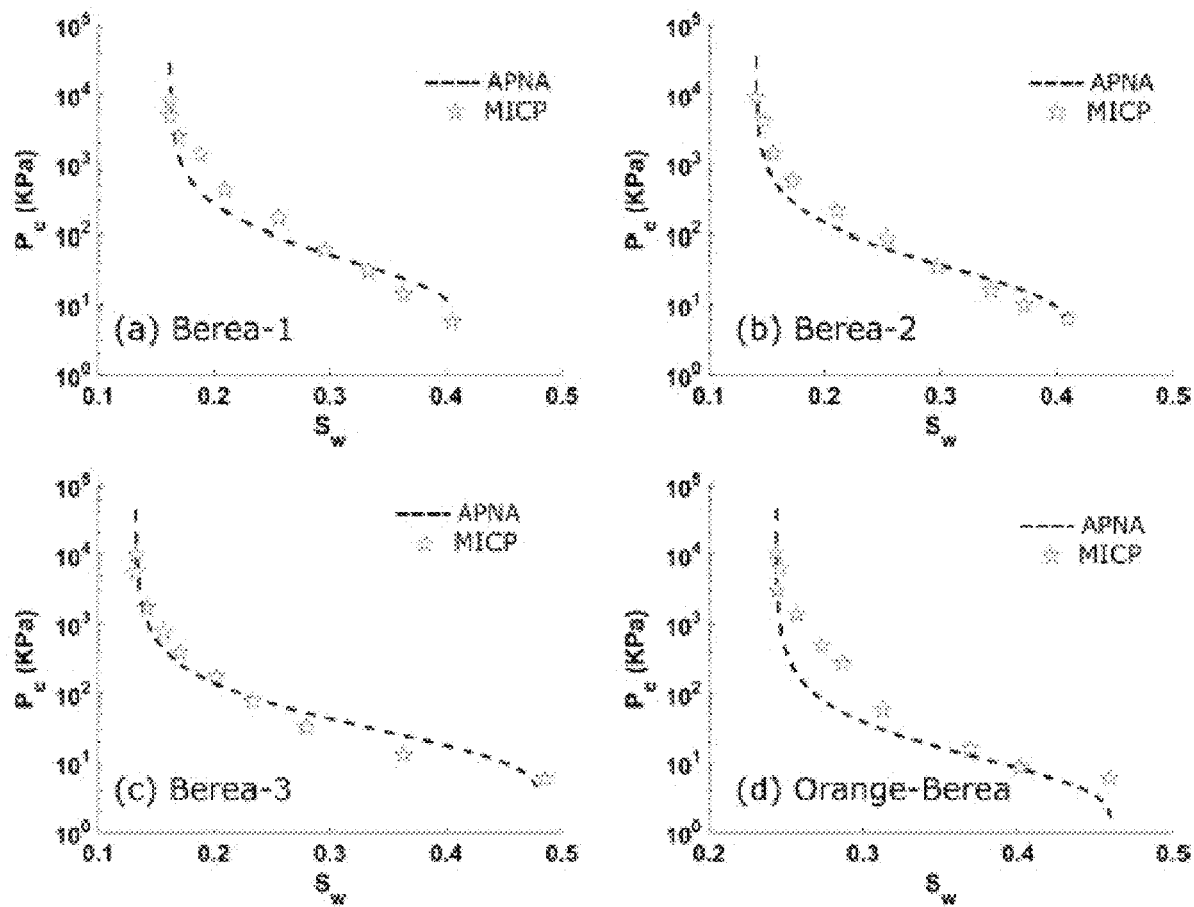
FIG. 13 illustrates a comparison between the provided method and conventional methods for forecasting multiphase flow properties of various Berea sandstone samples with differing grain textural properties under imbibition conditions.

The presently disclosed systems and methods were validated by testing the results from the disclosed systems and methods against experimental data obtained from literature. FIG. 11 illustrates the results of a sensitivity analysis performed for capillary pressure-saturation relationships generated by the provided methods. FIGS. 12 and 13 show a comparison between the provided method (APNA) and mercury injection capillary pressure (MICP) data of various Berea sandstone samples with differing grain textural properties under drainage conditions (FIG. 12) and imbibition conditions (FIG. 13). The MICP data and the input parameters required to generate the capillary pressure-saturation relationships with the presently disclosed method are provided in Table 2 below and were obtained from Churcher, P., French, P., Shaw, J., Schramm, L., Rock properties of Berea sandstone, Baker dolomite, and Indiana limestone, SPE International Symposium on Oilfield Chemistry (1991). The $r_{tmin}$ value was assumed to be $10 \times 10^{-9}$ m. $\beta°$ was computed using Equation 4 as described above, and the $r_g$ and a values were determined according to the above-described method. Overall, FIGS. 12 and 13 demonstrate that the results obtained by the presently disclosed method (APNA—dotted line) were in close agreement with the equivalent experimental data (MICP—star symbols), with the difference between the two being less than an order of magnitude.

TABLE 2

| | $s_{wi}*$ | $s_{wr}*$ | $r_t*$ (µm) | $r_b*$ (µm) | $\beta°$ | $\emptyset*$ | $r_{tmin}$ (nm) | a | $r_g$ (µm) |
|---|---|---|---|---|---|---|---|---|---|
| Berea-1 | 0.18 | 0.40 | 3.70 | 39.5 | 41.2 | 0.19 | 10 | 2 | 38.0 |
| Bata-2 | 0.16 | 0.41 | 6.10 | 48.0 | 40.2 | 0.21 | 10 | 2 | 52.3 |
| Berea-3 | 0.14 | 0.49 | 9.20 | 54.0 | 38.9 | 0.23 | 10 | 2 | 66.7 |
| Orange-Berea | 0.25 | 0.46 | 18.40 | 96.0 | 38.3 | 0.26 | 10 | 2 | 158.0 |

The presently disclosed method was further evaluated using Thomeer's Hyperbola Model, a known capillary pressure model. The Thomeer's empirical equation can be written as Equation 23 below. In Equation 23, $p_d$ represents the displacement pressure ($p_c$ when $s_w \approx 1$), $V_b$ is the fractional bulk mercury saturation, $V_\infty$ is the factional bulk mercury saturation at infinite $p_c$, and $F_g$ is the pore geometric factor. In Themeer's empirical model $F_g$ is illustrative of textural properties of porous media, and thus it is a fitting parameter that reflects the breadth of pore size distribution that is further an indication of sorting of particles in porous media. Large $F_g$ values demonstrate that the porous media is relatively poorly sorted. Through curve fitting, $F_g$ was determined for the presently disclosed method (APNA) and MICP capillary pressure results shown in FIG. 12. While curve fitting, $V_\infty$ was assumed to be equal to the porosity of the respective porous media. The values of $F_g$ for different types of Berea sand stone are shown in Table 3 below.

TABLE 3

| Porous Media | APNA | MICP |
|---|---|---|
| Berea-1 | 0.41 | 0.43 |
| Berea-2 | 0.38 | 0.40 |
| Berea-3 | 0.35 | 0.44 |
| Orange-Berea | 0.54 | 0.56 |

Figure 14:
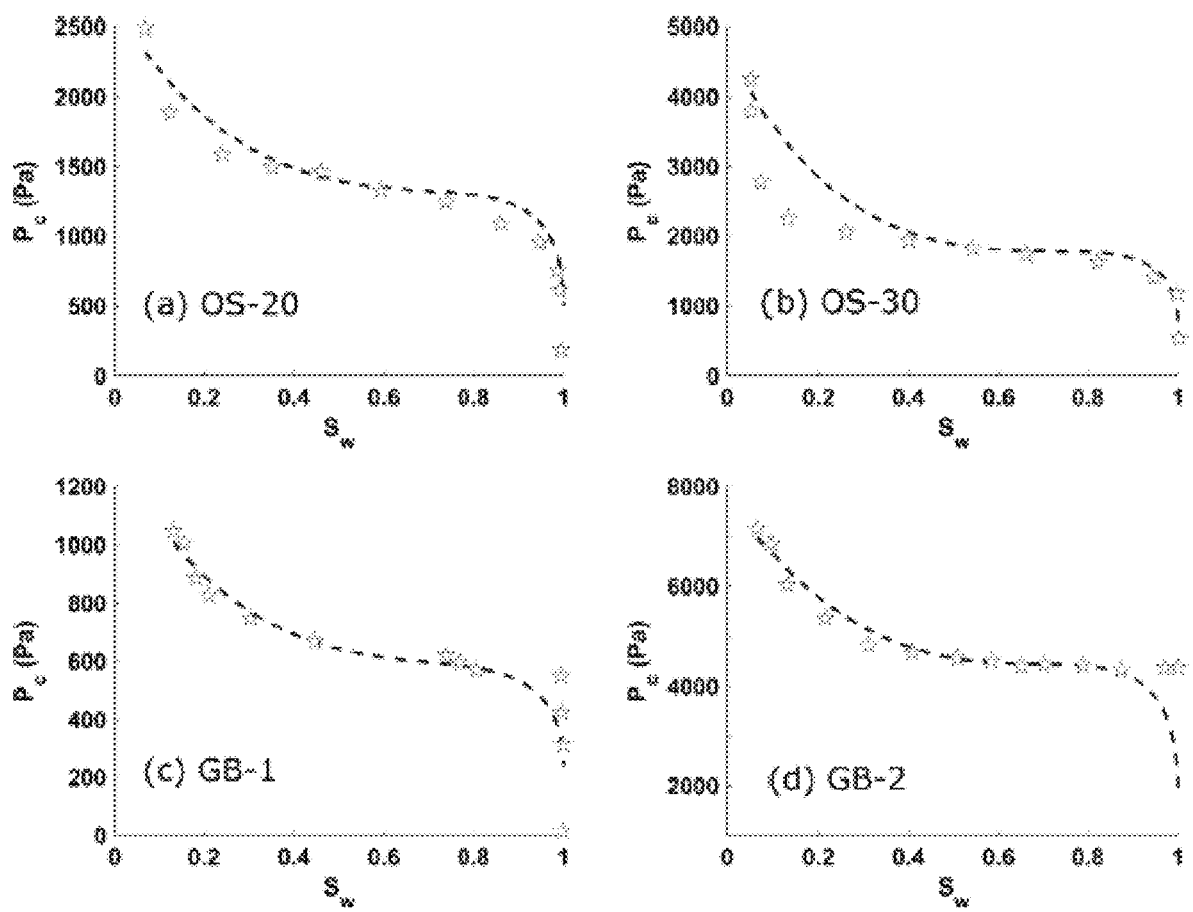
FIG. 14 illustrates a comparison between the provided method and data involving displacement of water by air in sand packs.

The presently disclosed method was further evaluated against capillary pressure data involving displacement of water by air in sand packs OS-20, OS-30, GB-1, and GB-2, which vary in pore size distribution. The results are shown in FIG. 14. The OS-20 and OS-30 sand pack data was obtained from Schroth, M., et al., Characterization of Miller-Similar silica sands for laboratory hydrologic studies. Soil Sci. Soc. Am. J. 60 (5), 1331 (1996). The GB-1 sand pack data was obtained from Hilpert, M., Miller, C., Pore-morphology-based simulation of drainage in to-tally wetting porous media. Adv. Water Resour. 24 (3-4), 243-255 (2001). The GB-2 sand pack data was obtained from Culligan, K., et al., Interfacial area measurements for unsaturated flow through a porous medium. Water Resour. Res. 40 (12) (2004). The input parameters required to generate the capillary pressure-saturation relationships with the presently disclosed method were also obtained from the directly preceding disclosures and are provided in Table 4 below. $\beta°$ was computed using Equation 4 as described above, and the $r_g$ and a values were determined according to the above-described method. Overall, FIG. 14 demonstrates that the results obtained by the presently disclosed method (APNA—dotted line) were in close agreement with the equivalent experimental data (sand pack results—star symbols), with the difference between the two being less than an order of magnitude.

TABLE 4

| | $s_{wi}*$ | $r_t*$ (µm) | $r_b*$ (µm) | $\beta°$ | $\emptyset*$ | $r_{tmin}$ (µm) | a | $r_g$ (µm) |
|---|---|---|---|---|---|---|---|---|
| OS-20 | 0.07 | 103 | 206 | 26.5 | 0.34 | 60.3 | 1.2 | 247.0 |
| OS-30 | 0.05 | 76.4 | 153 | 26.5 | 0.34 | 33.9 | 1.5 | 181.0 |
| GB-1 | 0.13 | 224 | 448 | 26.5 | 0.34 | 137.0 | 1.2 | 577.0 |
| GB-2 | 0.07 | 32.8 | 180 | 38.6 | 0.36 | 20.9 | 1.2 | 84.6 |

The presently disclosed method was additionally compared against capillary pressure results obtained from pore network modeling (PNM) from sandstones imaged using x-ray micro computed tomography. The input variables shown in Table 5 below for the presently disclosed method were directly estimated from the micro-CT images of rock samples and were computed using Avizo Fire 9.2. The micro-CT images of Clashach, Dodington, and Bentheimer sandstones were obtained from "Resources", Multi-phase flow in porous media (2019), https://www.mfpmresearch.com/resources.html. To compute $\beta$, the geometric mean of the pore throat distribution and geometric mean of the pore body distribution were employed with Equation 4 as described in more detail above. Given the limited resolution of x-ray micro computed tomography scans, $r_{tmin}$ was assumed to be $10 \times 10^{-9}$ m. The $r_g$ and a values were determined according to the above-described method. The comparison results between the provided method (APNA), PNM, and MICP are shown in FIG. 15 for the Clashach, Dodington, and Bentheimer sandstones.

TABLE 5

| | $s_{wi}*$ | $r_t*$ (µm) | $r_b*$ (µm) | $\beta°$ | $\emptyset*$ | $r_{tmin}*$ (µm) | a | $r_g$ (µm) |
|---|---|---|---|---|---|---|---|---|
| Clashach | 0 | 14.0 | 53.5 | 35.9 | 0.14 | 10 | 2 | 252 |
| Dodington | 0 | 17.7 | 57.9 | 34.4 | 0.21 | 10 | 2 | 238 |
| Bentheimer | 0 | 19.6 | 53.5 | 32.1 | 0.19 | 10 | 2 | 272 |

Figure 15:
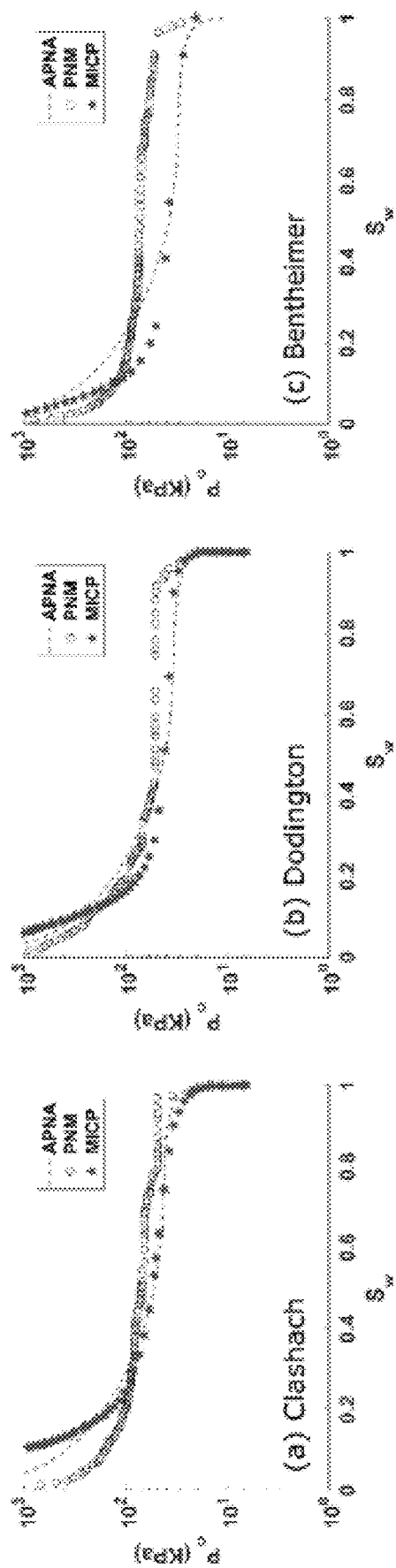
FIG. 15 illustrates a comparison between the provided method and pore network modeling.

The results shown in FIG. 15 indicate that the presently disclosed method (APNA) is able to capture the initial capillary pressure-saturation relationship ("$p_c(s_w)$") more accurately than PNM and MICP. For instance, there is considerable difference between the results obtained by PNM and the equivalent MICP dataset during the initial phase of displacement, whereas the presently disclosed method (APNA) is able to capture the initial trend more accurately. The improved accuracy of the provided method over conventional PNM approaches for capillary pressure estimation may be due to the analytical nature of the provided method, which makes it free from numerical instabilities while also providing flexibility for users to tune required input parameters to specific cases.

Figure 16:
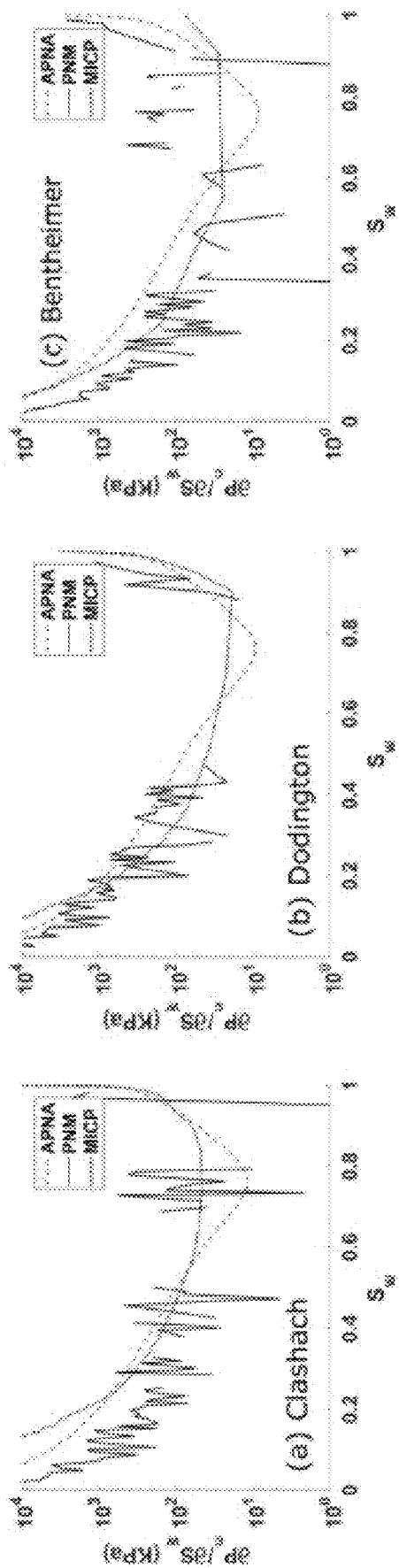
FIG. 16 illustrates a comparison between the provided method and pore network modeling.

FIG. 16 illustrates graphs of $$\frac{\delta p_c}{\delta s_w}$$

for each rock sample of FIG. 15. In many applications, such as reservoir simulation and solving the Buckley-Leverett equation (the classical macroscopic scale immiscible displacement model) it is $$\frac{\delta p_c}{\delta s_w}$$

rather than $p_c(s_w)$ that plays a critical role. The results in FIG. 16 indicate that the $$\frac{\delta p_c}{\delta s_w}$$

profile is smooth and continuous for MICP, but is highly irregular and discontinuous for PNM that can be ascribed to numerical inaccuracy. In contrast to PNM, the provided method (APNA) is much closer and consistent with MICP data, thus indicating the provided method's greater accuracy as compared to PNM.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A non-transitory, computer-readable medium storing instructions which, when performed by a processor, cause the processor to:
responsive to receiving one or more input parameters, generate a pressure-saturation relationship for a porous media thereby simulating capillary pressure-saturation behavior from one or more sample sizes based on the generated pressure-saturation relationship to reduce computational cost,
wherein the one or more input parameters include an interfacial tension along an interface between a wetting fluid and a non-wetting fluid, a contact angle between the interface and a pore wall of the porous media, and a pore throat size,
wherein the pore throat size is based on subparameters including a saturation of the wetting fluid, a saturation of the non-wetting fluid, a porosity of the porous media, and an orientation angle between a representative pore body size and a representative pore throat size, and wherein the representative pore body size ($r_b$), the representative pore throat size ($r_t$), and the orientation angle ($\beta$) are related according to the below relationship, $$r_b = \frac{r_t}{1 - \tan(\beta)}.$$

2. The non-transitory, computer-readable medium of claim 1, wherein the pressure-saturation relationship is generated according to the below relationship of input parameters, $$p_c(s_w) = \frac{2\sigma \cos(\theta)}{\hat{R}_t}$$

wherein $p_c$ is capillary pressure, $s_w$ is the saturation of the wetting fluid, $\sigma$ is the interfacial tension, $\theta$ is the contact angle, and $\hat{R}_t$ is the pore throat size.

3. The non-transitory, computer-readable medium of claim 1, wherein the pore throat size $\hat{R}_t$ is based on the below relationship of subparameters, $$\hat{R}_t = \frac{\overline{R}_t(s_n)}{(S_w^a + (1-s_w)^2)\exp(s_w)}, \text{ wherein}$$

$$\overline{R}_t(s_n) = \overline{R}_t(s_{n-1}) - \frac{\sqrt[3]{\emptyset s_{n-1}(1-\tan\beta)^3 r_g^3}}{3} \times \left[\frac{\frac{1}{2}+\frac{3}{2}(1-\tan\beta)^3}{\left[s_{n-1}\left[\frac{1}{2}+\frac{3}{2}(1-\tan\beta)^3\right]-\emptyset s_{n-1}\left[\frac{1}{2}+\frac{3}{2}(1-\tan\beta)^3\right]\right]^{\frac{4}{3}}}\right] \times [s_n - s_{n-1}],$$

wherein $s_w$ is the saturation of the wetting fluid, $s_n$ is the saturation of the non-wetting fluid, $\beta$ is the orientation angle, $\emptyset$ is the porosity, $r_g$ is a representative grain size, and a is the rugosity.

4. The non-transitory, computer-readable medium of claim 1, wherein a pore body size $\hat{R}_b$ is related to the pore throat size $\hat{R}_t$ according to the below relationship, $$\hat{R}_b = \frac{\hat{R}_t}{1-\tan(\beta)}$$

wherein $\beta$ is the orientation angle.

5. The non-transitory, computer-readable medium of claim 1, wherein the pressure-saturation relationship is generated according to the below relationship of input parameters, $$p_c(s_w) = \frac{2\sigma \cos(\theta)}{\hat{R}_b}$$

wherein $p_c$ is capillary pressure, $s_w$ is the saturation of the wetting fluid, $\sigma$ is the interfacial tension, and $\theta$ is the contact angle.

6. The non-transitory, computer-readable medium of claim 1, wherein the orientation angle is based on a mean pore body size and a mean pore throat size.

7. The non-transitory, computer-readable medium of claim 1, wherein one of the orientation angle and the porosity is extracted from one or more images.

8. The non-transitory, computer-readable medium of claim 1, wherein the subparameters further include a representative grain size and a rugosity of the porous media.

9. A system for forecasting multiphase flow properties through porous media, the system comprising:
a processor; and
a memory storing instructions which, when executed by the processor, cause the processor to:
responsive to receiving one or more input parameters, generate a pressure-saturation relationship for a porous media thereby simulating capillary pressure-saturation behavior from one or more sample sizes based on the generated pressure-saturation relationship to reduce computational cost,
wherein the one or more input parameters include an interfacial tension along an interface between a wetting fluid and a non-wetting fluid, a contact angle between the interface and a pore wall of the porous media, and a pore throat size, and
wherein a pore body size $\hat{R}_b$ is related to the pore throat size $\hat{R}_t$ according to the below relationship, $$\hat{R}_b = \frac{\hat{R}_t}{1 - \tan(\beta)}$$

wherein $\beta$ is an orientation angle.

10. The system of claim 9, wherein the pore throat size is based on subparameters including a saturation of the wetting fluid, a saturation of the non-wetting fluid, a porosity of the porous media, the orientation angle between a representative pore body size and a representative pore throat size, a representative grain size, and a rugosity of the porous media.

11. The system of claim 9, wherein one of the porosity and the orientation angle is determined through one or more images.

12. The system of claim 9, wherein the pressure-saturation relationship is generated according to the below relationship of input parameters, $$p_c(s_w) = \frac{2\sigma \cos(\theta)}{\hat{R}_t}$$

wherein $p_c$ is capillary pressure, $s_w$ is the saturation of the wetting fluid, $\sigma$ is the interfacial tension, $\theta$ is the contact angle, and $\hat{R}_t$ is the pore throat size.

13. The system of claim 10, wherein the pore throat size $\hat{R}_t$ is based on the below relationship of subparameters, $$\hat{R}_t = \frac{\overline{R}_t(s_n)}{(S_w^a + (1 - s_w)^2) \exp(s_w)}, \text{ wherein}$$

$$\overline{R}_t(s_n) = \overline{R}_t(s_{n-1}) - \frac{\sqrt[3]{\phi s_{n-1}(1 - \tan\beta)^3 r_g^3}}{3} \times$$

$$\left[ \frac{\frac{1}{2} + \frac{3}{2}(1 - \tan\beta)^3}{\left[ s_{n-1}\left[\frac{1}{2} + \frac{3}{2}(1 - \tan\beta)^3\right] - \phi s_{n-1}\left[\frac{1}{2} + \frac{3}{2}(1 - \tan\beta)^3\right] \right]^{\frac{4}{3}}} \right] \times [s_n - s_{n-1}],$$

wherein $s_w$ is the saturation of the wetting fluid, $s_n$ is the saturation of the non-wetting fluid, $\beta$ is the orientation angle, $\emptyset$ is the porosity, $r_g$ is the representative grain size, and a is the rugosity.

14. The system of claim 9, wherein the pressure-saturation relationship is generated according to the below relationship of input parameters, $$p_c(s_w) = \frac{2\sigma \cos(\theta)}{\hat{R}_b}$$

wherein $p_c$ is capillary pressure, $s_w$ is the saturation of the wetting fluid, $\sigma$ is the interfacial tension, and $\theta$ is the contact angle.

15. The system of claim 9, wherein the orientation angle is based on a mean pore body size and a mean pore throat size.

16. A method for forecasting multiphase flow properties through porous media, the method comprising:
determine one or more input parameters, wherein the one or more input parameters include a porosity of a porous media, an orientation angle between a representative pore body size and a representative pore throat size, and a representative grain size; and
input the one or more parameters to generate a pressure-saturation relationship for the porous media thereby simulating capillary pressure-saturation behavior from one or more sample sizes based on the generated pressure-saturation relationship to reduce computational cost,
wherein the pressure-saturation relationship is based on an interfacial tension along an interface between the wetting fluid and the non-wetting fluid, a contact angle between the interface and a pore wall of the porous media, the porosity, the orientation angle, and the representative grain size,
wherein a pore body size $\hat{R}_b$ is related to the pore throat size $\hat{R}_t$ according to the below relationship, $$\hat{R}_b = \frac{\hat{R}_t}{1 - \tan(\beta)}$$

wherein $\beta$ is the orientation angle.

17. The method of claim 16, wherein at least one of the porosity or the orientation angle is determined through one or more images.

18. The method of claim 16, wherein the method further comprises determining the representative grain size such that the pore throat size decreases or is constant as a saturation of the wetting fluid increases.

* * * * *